(No Model.) 2 Sheets—Sheet 1.

C. G. ROBERTS.
RAIN WATER SEPARATOR.

No. 354,238. Patented Dec. 14, 1886.

Witnesses:
James P. DuHamel.
Walter S. Dodge.

Inventor:
C. G. Roberts,
by Dodge & Son,
Attys.

(No Model.) 2 Sheets—Sheet 2.

C. G. ROBERTS.
RAIN WATER SEPARATOR.

No. 354,238. Patented Dec. 14, 1886.

Witnesses:
James P. DuHamel
W. A. Dodge

Inventor:
C. G. Roberts
by Dodge & Son
Attys.

UNITED STATES PATENT OFFICE.

CHARLES GAY ROBERTS, OF COLLARDS, HASLEMERE, COUNTY OF SURREY, ENGLAND.

RAIN-WATER SEPARATOR.

SPECIFICATION forming part of Letters Patent No. 354,238, dated December 14, 1886.

Application filed June 7, 1886. Serial No. 204,362. (No model.) Patented in England February 16, 1883, No. 858, and September 16, 1885, No. 10,994.

*To all whom it may concern:*

Be it known that I, CHARLES GAY ROBERTS, of Collards, Haslemere, in the county of Surrey, England, have invented certain new and useful Improvements in Rain-Water Separators, (for which I have received Letters Patent in Great Britain, dated September 16, 1885, No. 10,994,) of which the specification is hereunto annexed, marked with the letter A.

This invention relates to rain water separators; and the invention consists in certain novel features of construction, whereby the apparatus is caused to automatically change its position, so as to separate the pure from the impure water, as hereinafter fully described.

Figure 1:
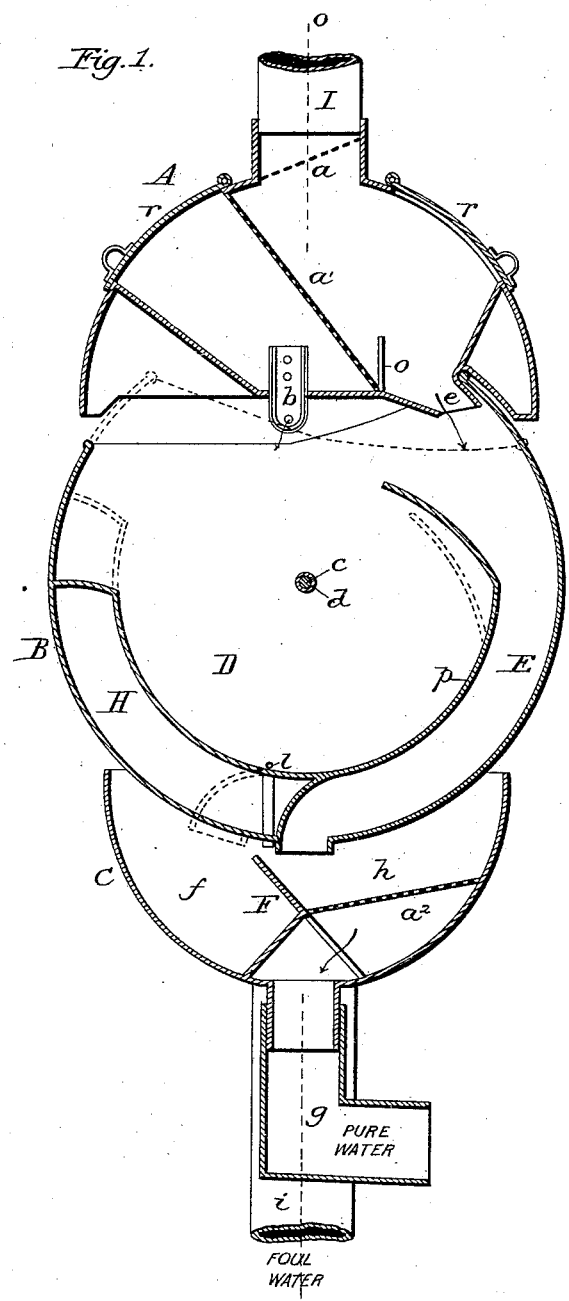
Figure 2:
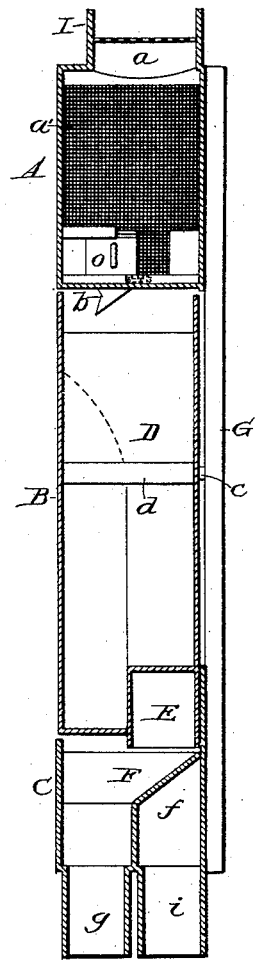
Figure 3:
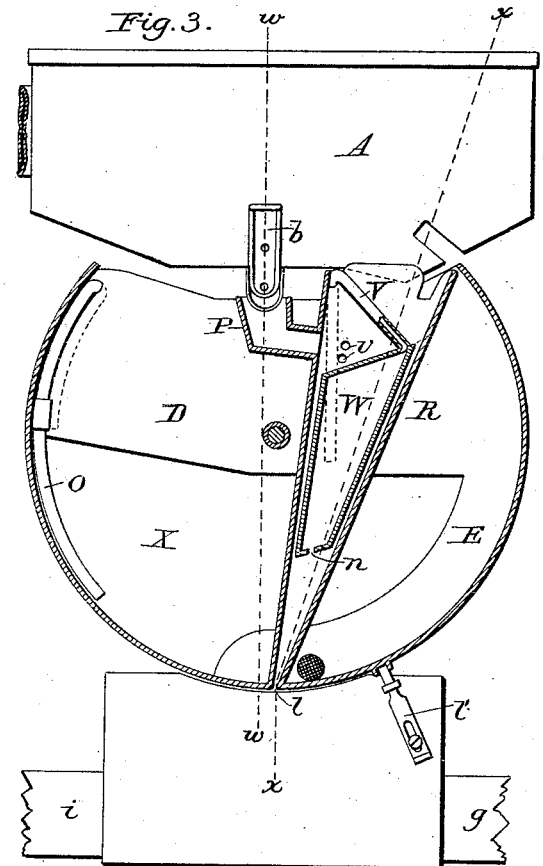
Figure 4:
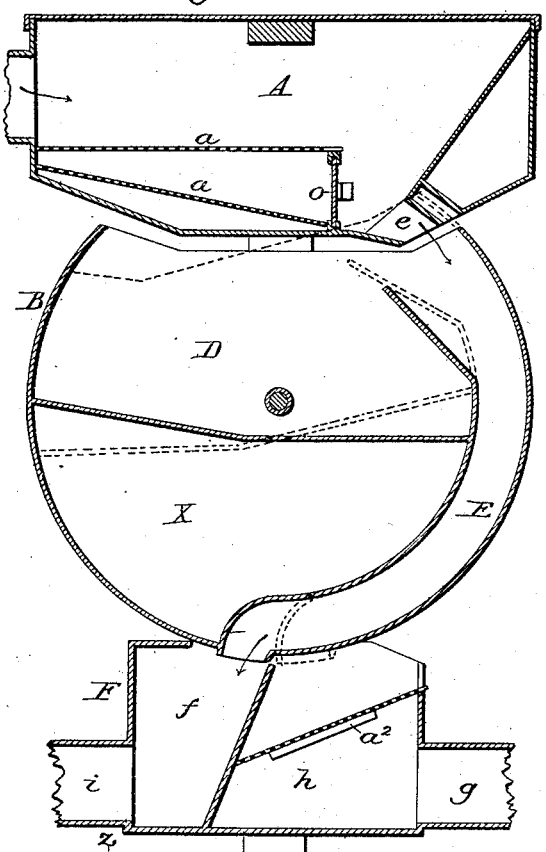
Figure 5:
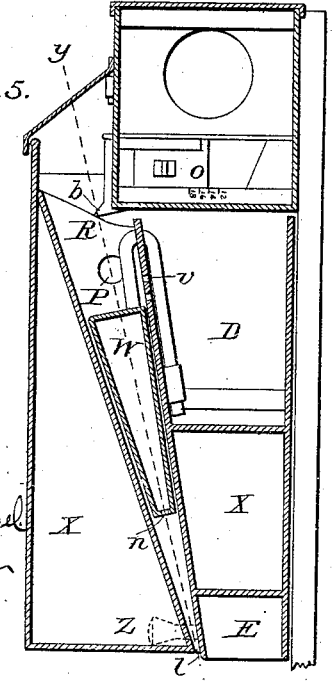
Figure 6:
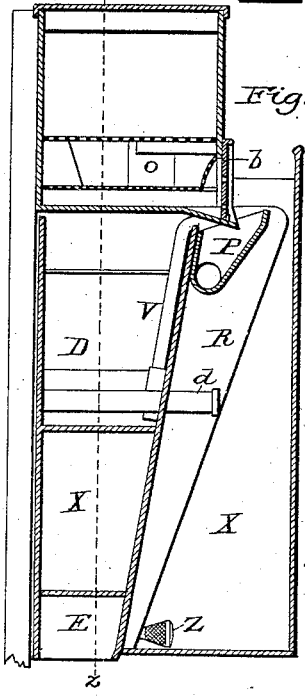

Figure 1 is a longitudinal vertical section on the line $v\ v$ of Fig. 2, and Fig. 2 is a transverse vertical section on the line $o\ o$ of Fig. 1, showing the separator in its simpler form. Fig. 3 is a front elevation, partly in section, and Fig. 4 is a transverse vertical section on the line $z\ z$ of Fig. 6. Fig. 5 is a vertical section on the line $x\ x$ of Fig. 3, and Fig. 6 is a similar view on the line $w\ w$ of Fig. 3, these Figs. 3, 4, 5, and 6 showing the separator in what I call the "compound" form.

This separator consists of three parts, the receiver A, the canter B, and the outlet-box C; these three parts being connected by a bar, G, as shown in Fig. 2, the parts A and C being rigidly secured to the bar or frame, so as to remain stationary, while the canter B is mounted upon a pin or journal, $c$, rigidly secured to the bar G, said pin or journal fitting in a tubular bearing, $d$, located at or near the center of the canter B, as shown in Figs. 1 and 2.

The receiver A is a box of any suitable shape, to which the rain-spout I delivers the water from the roof, it being provided on one or both sides with a door, $r$, by which access can be had to its interior. Within the receiver A I arrange one or more screens, $a$, to prevent the entrance of leaves, sticks, &c., into the parts below. These screens are movable, so they can be cleared if they require it.

Within the receiver A, I locate a partition, which has a sliding door, $o$, as shown in Fig. 2, which is adjusted to correspond to the area of the roof. At the lower right-hand corner is a spout or opening, $e$, for the passage of the water to the canter C, and at one side, near the center, is an opening for the reception of the slide $b$, which is provided with one or more small holes, as shown in Fig. 1, through which a small portion of the water can pass into the chamber D of the canter B below, this slide $b$ being made removable, so that slides having different-sized holes can be used at will, and thus vary the time required to fill the chamber D.

The canter B is cylindrical in form, as shown in Fig. 1, its upper portion being cut away and left open to nearly the width of the receiver, as shown in Fig. 1. It has secured within it a partition, $p$, arranged, as shown in Fig. 1, so as to form a chamber, D, and a channel or spout, E, at one side of the same, the part H being an air-chamber simply for balancing the canter on its journal. There is also a small hole or tube, $l$, at the bottom of chamber D, smaller than the hole in the slide $b$, so that the water can escape from the chamber D after the rain has ceased to permit the canter to resume its original position, as hereinafter explained.

The outlet-box C has a partition, F, which divides it into two chambers, $f$ and $h$, as shown in Fig. 1, each chamber having a separate spout, as shown, the spout $i$ leading from the chamber $f$ and the spout $g$ from the chamber $h$, in which latter I also place a screen, $a^2$.

The canter B is so weighted or adjusted that when empty it will occupy the position shown by the dotted lines in Fig. 1, in which case it will be seen that the mouth of the spout E will be thrown to the left of the partition F, and will then deliver its water into the foul-water chamber $f$. By this means the first fall of rain, which carries with it all the dust, soot, &c., on the roof, will be conveyed to the chamber $f$, from whence it will escape through pipe $i$, which may be arranged to deliver this foul water upon the ground or into a sewer or ditch, and thus let it run to waste. By the time the roof has been thoroughly washed the water, which in the meantime has been passing through the hole in the slide $b$, will have filled the chamber D of the canter, which will be thereby overbalanced and made to swing to the position shown by the full lines in Fig. 1, thus bringing the mouth of the spout E to the right-hand side of the partition F, as shown in Fig. 1, when the water will be delivered into the chamber h, from whence it will flow through pipe g to the cistern or tank, and this will continue so long as the rain continues. After the rain has ceased the water in chamber D will gradually escape through the small hole l, which will permit the canter to swing back to the position shown by dotted lines, ready at the commencement of the next rain to carry the foul water to the spout i, as above stated.

As the water which enters chamber D through the hole in slide b is continuously escaping through the hole l, it will be of course understood that the hole l must be smaller than the hole in slide b, as otherwise the chamber would never be filled. The time required to fill the chamber D should of course be adapted to the circumstances of each locality, and this can be done by changing the slide b for one having larger or smaller holes, the larger ones filling the chamber sooner, and the smaller ones in less time.

The water will be clean as soon as a certain quantity of rain has washed over each one hundred square feet of roof—viz., one gallon in the country, one and one-half gallon in a small town, and two gallons in a city. Three slides, b, are used, marked 1, 1½, and 2 gallons, respectively. The gallon of water will descend in one hour of light, or in five minutes of heavy, rain. It is therefore necessary that the time occupied in the filling up and canting of D should vary accordingly. This result is obtained by carefully regulating the depth at which the water stands above b before the chief volume of it flows out at e. With each increase in the heaviness of the rainfall there is an increase in the depth of the water in A, and consequently a slight increase in the quantity of water passing out of b, which causes D to fill up and cant in a shorter time. The volume of water passing out at e depends upon the heaviness of the rainfall and the size of the roof. To make the depth of the stream always correspond to the heaviness of the rainfall, it is necessary to make the breadth of the stream exactly correspond to the area of the roof. For this purpose a graduated scale is provided, as shown in Fig. 2.

It will be observed that in heavy rain the chief volume of the water will wash away the leaves and other rubbish that have been previously deposited on the surface of the screen a, carrying them away through e, E, f, and i.

Where it is desired to save all the rain-water possible, the internal arrangement of the canter may be varied, as shown in Figs. 3, 4, 5, and 6. In this case the canter B is provided with the chamber D and spout E, as before, and with an auxiliary chamber, X, this latter being the full width and depth of the canter, which is made thicker so as to project out forward beyond the face of the receiver, as shown in Figs. 5 and 6, thus furnishing the space necessary for the additional chamber X. Within this chamber X, I place a conical tube or funnel, R, which has a small opening, l, at its lower end, as shown in Fig. 5, and at one side, near the top, I attach a spout, P, as shown in Fig. 3, to receive the water that flows through the holes in slide b and conduct it through the funnel R, there being one or more holes, v, in the side of funnel R, through which the water can flow into the chamber D, as shown in Figs. 4 and 5, the hole l in this, as in the former case, being smaller than the holes in the slide, so that the funnel and the chamber D will be gradually filled, notwithstanding the constant escape of water through the smaller hole l. I connect the chamber D with the chamber X by a siphon, O, as shown in Fig. 3, and in the funnel R, I place another siphon composed of a funnel-shaped box, W, which has a hole in its lower end, as shown in Figs. 3 and 5, and is connected at its upper end to a bent tube, V, which terminates in the chamber D, as shown in Figs. 3, 5, and 6. In the bottom of chamber X there is also a small hole covered with a wire-gauze strainer, Z, as shown in the same figures. When thus modified the operation is as follows: The first rain, with the dust, soot, &c., from the roof, enters the receiver A and passes through the spout E into the foul-water chamber f, and from thence goes to waste through the pipe i. In the meantime the water passing through the holes in slide b is conducted by spout P into the funnel R, which gradually fills up to the holes v, through which it flows into chamber D until the weight of the water therein is sufficient to turn the canter B on its journal to the position shown in dotted lines in Fig. 4. This movement of the canter B not only changes the delivery of spout E from the foul-water chamber f to the clean-water chamber h, as previously described, but it also moves the spout P to one side, so that thereafter the clean water which flows through the holes in the slide b, instead of being conducted into the funnel R, falls directly into the auxiliary chamber X, which thus becomes gradually filled, and when filled the water flows from it through the siphon O into chamber D, and thus fills that also. It will be observed that the upper point or bend of the siphon O is a little lower than the top of the partition between the chambers D and X, so that whenever X is filled with water O acts not as a siphon, but as an overflow-pipe. It subsequently siphons the water back from D into X, as hereinafter explained. In the meantime, while chamber X is thus being filled with clear water, the foul water, with which chamber D was filled at first, is drawn therefrom by the siphon V W into and is discharged through funnel R, thus having the chamber D ready to receive clean water from chamber X when the latter is filled, as before stated.

The canter is held in position to conduct the water to the cistern by the clean water in the chamber X, and also chamber D when the latter is filled. The size of chamber X and the escape or outlet Z are such that the water in chamber X will hold the canter in position for about three and a half hours, and when both chambers X and D are filled the canter will be held in position about four hours after the rain has ceased, the object being to hold it in position to secure the clean water, when there is a succession of showers at short intervals, as not unfrequently occurs. After the rain has ceased the water in chamber X will gradually escape through the small outlet Z, and when it has fallen low enough in X to start the siphon O the water in chamber D will be siphoned over into chamber X, and thus both will be emptied in due time, when, of course, the canter will swing back to its original position, where it will remain until another shower occurs, and until the roof has been cleansed and the foul water carried off through the foul-water or waste pipe $i$, as previously explained, and until it is again tipped or canted by the weight of the water which accumulates in chamber D. It will therefore be seen that the principle or mode of operation of the canter is the same, and that it is automatically adjusted in both cases, the only difference being that by the addition of the auxiliary chamber and the siphons the canter is held in position for a longer time than when the chamber D is used alone, as shown in Figs. 1 and 2.

As shown in Fig. 3, I secure a sliding bolt, $l'$, on the outlet-box C to engage with the canter D and lock it in position, in case it be desired.

The separator may be located at any point desired between the roof and cistern or storage-tank, and any number of them may be used, according to circumstances.

By this construction I am enabled to produce a rain-water separator that is strong and durable, and that is perfectly automatic in its operation, and not liable to get out of order.

I am aware that various forms of rain-water separators have been patented, in which pivoted spouts and receptacles to be gradually filled with water to operate or tilt the same are shown, and also that there is shown in English Patent No. 3,996 of 1878 a pivoted canter or tank having a small pivoted cup arranged therein, and another form in which the canter or tank has connected to it a pivoted rod which in turn is pivoted to a spout pivoted to the receiver above, and therefore I do not claim any of these; but

What I claim as my invention is—

1. The combination, in a rain-water separator, of the stationary receiver A, provided with the delivery-outlet $e$ at one end, and the graduated side delivery, $b$, with the circular pivoted canter B, provided with chamber D, and the delivery-spout E around one side thereof, with the stationary outlet-box or separator C, provided with the two compartments $f$ and $h$, each provided with a separate outlet, the whole being constructed and arranged to operate substantially as shown and described.

2. The pivoted canter B, provided with the chambers X and D, connected by a siphon, O, and the funnel R, connected to the chamber D by siphon V W, all arranged to operate substantially as described.

3. The receiver A, provided with the transverse partition $a'$, with the adjustable slide $o$, and the perforated detachable slide $b$ for regulating the flow of the water to the chamber in the canter B, as set forth.

CHAS. GAY ROBERTS.

Witnesses:
  ROBERT H. I. COMERFORD,
  AUG. SPICAUD,
*Clerks to Messrs. Comerford & Co., 7 Tokenhouse Yard, London, Public Notaries.*